April 21, 1964 E. SCHMIDT 3,130,110

COMPUTER RECORDING DISC ASSEMBLY

Filed Feb. 15, 1961

INVENTOR.
EDWARD SCHMIDT
BY
Emery Whittemore Sandoe & Graham
ATTORNEYS

United States Patent Office 3,130,110
Patented Apr. 21, 1964

3,130,110
COMPUTER RECORDING DISC ASSEMBLY

Edward Schmidt, Pound Ridge, N.Y., assignor to Reeves Soundcraft Corp., Danbury, Conn.

Filed Feb. 15, 1961, Ser. No. 89,524
7 Claims. (Cl. 161—42)

This invention relates to an improved magnetic recording disc.

In many applications, such as random access memories, it is found desirable to employ a plurality of discs upon which information can be magnetically recorded. Examples of such applications are particularly common in computer technology.

In the magnetic disc known to the art, rigid disc structures of considerable mechanical precision and flatness have been employed. However, when digital information is recorded on the disc and the discs are rotated at relatively high speeds, the lack of compliance between the disc surface and the recording and read out head introduces severe amplitude modulation of the stored signal. The amplitude modulation is often so severe as to interfere with the reliability of recovery of information stored in the form of binary bits.

Further, the rotational speed must be held relatively low with existing discs. The inability to obtain a mechanically flat disc of requisite precision at economical costs resulted in the recording head bouncing away from the surface of the disc.

The lack of compliance between the disc surface and the head has been compensated for in some of the prior art devices by separating the head and the surface of the disc. However, the air gap prevents recording of information at high densities which is required in many applications.

As a specific example, a typical computer application would require storage of 333 discrete digital pulse data points per linear inch on the magnetic recording surface. The disc must be rotated at a speed of approximately 300 r.p.m. to supply the computer with information at a rate commensurate with the information acceptance rate of the computer.

The discs known to the prior art are unacceptable in such application. For example, discs have been made by dispersing a magnetic oxide pigmented vinyl dispersion on the surface of a solid disc, such as an aluminum disc. Alternatively, discs have been made by casting a rubber based magnetic oxide pigmented dispersion on the surface of a metal disc. Thus, the discs are rigid structures and extreme mechanical tolerances of flatness must be maintained in assembly if the solid disc is to have any practical use. For example, most discs of this nature would be limited to a rotational speed of 50 r.p.m. to prevent head bouncing as the disc rotates. Maintenance of the requisite flatness for rotational speeds of 300 r.p.m. would make constructional costs prohibitive.

In the specific application the mounting of the head to provide an air gap between the head and the magnetic recording surface would preclude obtaining the requisite information packing density on the recording surface.

It is, therefore, an object of this invention to provide a magnetic disc for the magnetic recording of binary information of high packing densities and in which the magnetic media is compliant to the read-out and read-in heads.

In accordance with this object, there is provided, in a preferred embodiment of this invention, a rigid disc, such as a molded plastic disc, having an annular surface provided for the magnetic information storage media. In the present form the metal or plastic disc has a recessed annular surface to accommodate the storage media, as hereinafter described. This recess is provided to protect the surface of the magnetic layer from physical damage but the recess is not a necessary part of the invention.

A resilient annular ring, such as a backing sheet, to which is applied a thin flocking coat, is bonded to the plastic base. The ring width is such as to expose a narrow strip of the plastic disc at the inner and outer diameter of the flocked ring.

An annular ring of magnetic recording material, such as a non-oriented oxide pigment applied to a carrier film, is laid over the flocked ring and bonded to the exposed strips of the plastic base at the inner and outer periphery of the flocked ring. The magnetic recording material can be of conventional formulation suitable for the application intended and can be made of either an acicular or non-acicular oxide. If an acicular oxide is used, the particle orientation arrangement should be such that no more than 10% directional difference is achieved, thereby insuring the uniformity of magnetic output as the disc is rotated.

The recording surface thus encloses the flocked ring, being bonded to the base disc at the inside and outside of the flocked ring and providing a resilient recording surface over the central area of the ring which merely rests on the flocked ring. The resultant assembly is a relatively flat disc, having, however, the effect of air flotation of the thin magnetic layer, developed by the rotation of the disc, to a degree that a substantially completely resilient recording surface is provided to obtain excellent compliance of the magnetic coating to the head at the required rotational speeds. Thus, the material recorded thereon may be extracted therefrom with approximately the same characteristics as that of a roll of magnetic tape without the problems related to rolled tape transport and access.

A preferred embodiment of the invention is shown in the accompanying drawings, of which:

Figure 1:
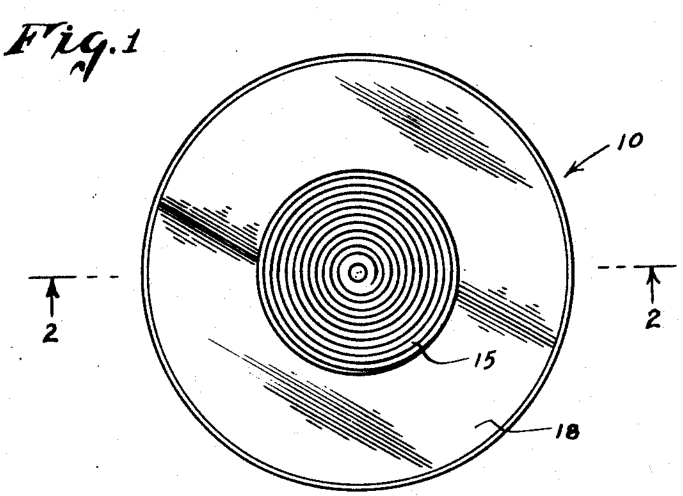
FIG. 1 is a plan view of a disc constructed in accordance with this invention.
Figure 2:
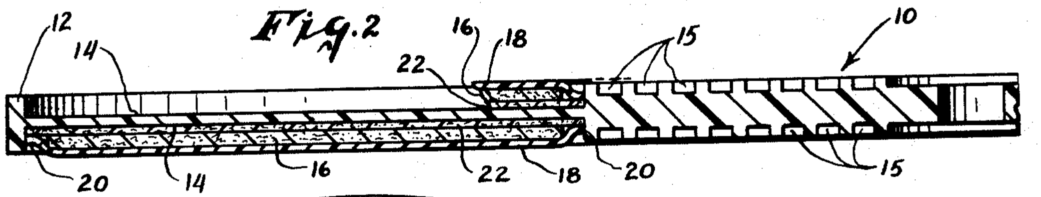
FIG. 2 is a cross section taken along lines 2—2 of FIG. 1.
Figure 3:
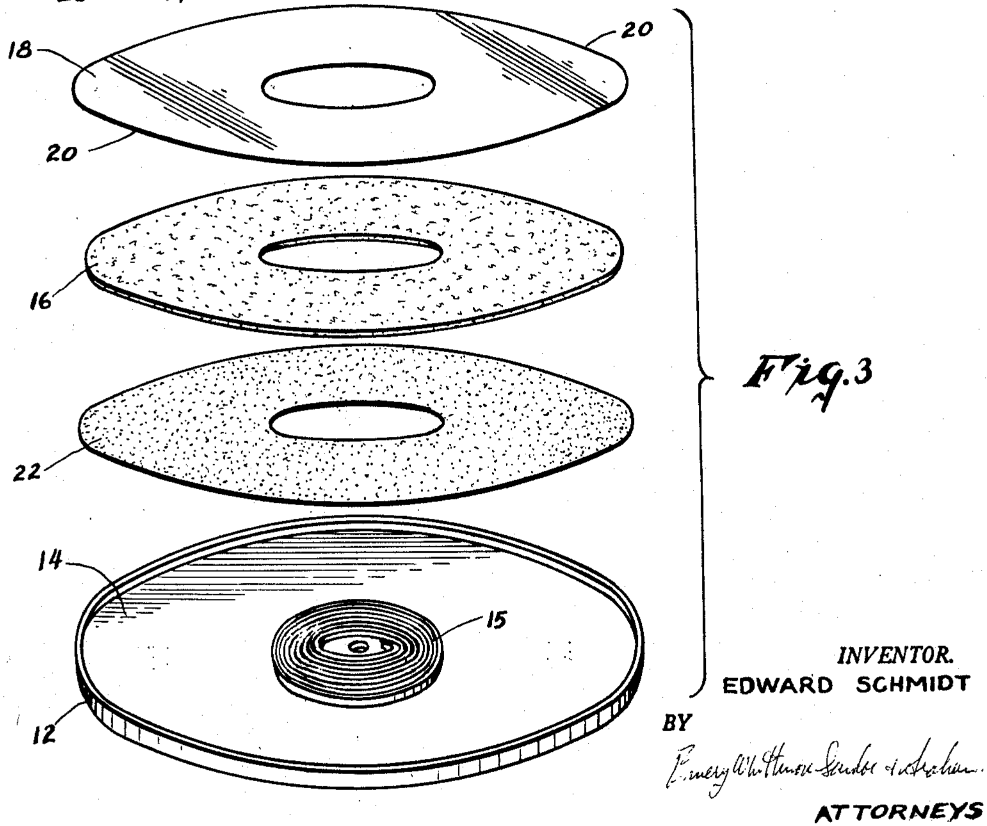
FIG. 3 is an exploded view of the disc shown in FIGS. 1 and 2.

In the figures there is shown a recording disc 10 fabricated on a rigid base 12, such as a molded plastic disc. The disc is provided with a flat annular surface 14 recessed into the base thereof for receipt of the information storage media. The recess protects the storage media from physical damage. A spiral groove 15 may be provided in the center portion of the disc to provide tracking guidance of the recording heads, but this groove is not a necessary part of this invention. Any convenient means of tracking guidance can be provided.

An annular resilient pad 16 is inserted within the recessed surface 14 and bonded to the surface, but it is not necessary to bond the underlaying resilient ring to the plastic backing in order to achieve correct operational characteristics. The bonding here is mainly for convenience during assembly. This resilient material is preferably a flocked polyester film approximately $\frac{1}{32}$-in. thick. However, soft crepe paper, soft latex rubber, or other forms of resilient pad may be used. The base material may be of conventional thickness, such as a one-mil thick film of polyester film sold under the Du Pont trade name Mylar. The resilient pad is die cut in annular form to leave a gap between it and the recess 14 at the inner and outer diameters thereof, thereby exposing a small strip of the plastic disc at the inner and outer diameter.

The recording material 18, such as a one-mil polyester film (Mylar) base having magnetic oxide pigment bonded thereto, is die cut in annular form to match the inner diameter and outer diameter of the recess 14. The recording material 18 is stretched across the resilient pad to eliminate wrinkling and the edges 20 are bonded to the exposed strips of the plastic base material 12 at the inside and outside of the flocked ring. The recording material thus encloses the resilient pad and the recording surface becomes substantially more resilient than the bed on which it is resting due to the fact that the thin Mylar base of the recording surface is not firmly bonded to the flocked surface of the bed. Therefore, a provision is automatically provided to, in effect, air float the magnetic recording media against the pole tips of the recording heads. This effect can be observed at 100 r.p.m. and becomes more noticeable at higher speeds. It should be emphasized that the recording ring is not bonded to the resilient pad but encloses it.

While the flocked material and the recording material may be bonded (e.g., by cementing) to the plastic disc 12 directly, for convenience and ease of assembly I have found it advisable to insert an annular ring 22 of high grade kraft paper within the recess 14. A time-dwell, or pressure sensitive adhesive, is applied to both sides of the ring. In conventional assembly practice, the adhesive on the sides of the annular ring is covered by layers of standard release paper. Thus, the release paper on one side of the annular ring 22 may be stripped from the ring and the ring inserted within the recess under sufficient pressure to bond it to the plastic base 12. The release paper on the other side is then stripped off and the flocked annular ring bonded in place under suitable pressure. Care must be exercised to expose an annular strip of the pressure sensitive adhesive at the inside and outside of the flocked material. The ring of recording material is then applied over the ring of flocked material and pressure applied to bond it to the annular strips of exposed adhesive of the disc 22 at both the inner and outer diameters thereof. During bonding it is desirable to apply tension in radial directions so that the ring of magnetic material will lie flat without wrinkling.

A disc assembly in accordance with this invention can be used at rotational speeds, such as 300 r.p.m. in a typical application to computer technology. The information bits may be stored in the form of magnetic impulses on the pigment at high density levels of at least 333 data points per linear inch. The resiliency of the flocked material coupled with the fact that the Mylar ring of magnetic material is free floating above the surface of the flocked material and therefore provides air flotation to maintain intimate head to magnetic surface contact. The resultant item is a solid structure which has the ability to record and play back magnetic data at a packing density which rivals that of conventional magnetic tape, permitting extraction of and storage of binary bit information without erroneous readings due to amplitude modulation of the pulses caused by deflection of the magnetic surface from the read-out head at the high rotational speeds used in computer feeds. A disc was "read" 10,000 consecutive times without the loss of a single data point.

This invention may be variously embodied and modified within the scope of the subjoined claims.

What is claimed is:

1. A magnetic recording disc comprising a rigid disc, an annular resilient pad and an annular film of magnetic recording material extending over said resilient pad and being bonded to said disc only along the inner and outer periphery of said pad.

2. A disc according to claim 1 in which said resilient pad compriess a polyester film base material to one side of which flocking is applied, said pad being bonded to said disc so that said flocking contacts said annular film of magnetic recording material.

3. A disc in accordance with claim 1 which includes an annular ring coated with pressure sensitive adhesive on both sides, said annular ring being bonded to said rigid disc and to said annular resilient pad, said ring being wider than said pad to leave a strip of said ring exposed at the inner and outer periphery of said pad, said film of recording material being of the same size as said annular ring and being bonded to the exposed surface of said ring at the inner and outer diameters thereof.

4. A magentic recording disc comprising a rigid disc having an annular recess in at least one surface thereof, an annular ring having a pressure sensitive adhesive on both sides thereof, said annular ring having the same inner and outer diameters as said recess, said ring being inserted within said recess and bonded to said disc, an annular resilient pad, said pad having a smaller outer diameter and a larger inner diameter to expose a strip of said ring at the inner and outer edges of said pad, an annular film having a magnetic recording surface, said film being laid over said pad and bonded to said ring along said exposed strips.

5. A disc in accordance with claim 4 which said annular ring comprises kraft paper.

6. A disc in accordance with claim 4 in which said magnetic recording surface is formed of acicular particles oriented so that there is no more than 10% directional difference in the saturated output characteristics of the surface.

7. A disc in accordance with claim 4 in which said resilient pad comprises a polyester film base material to one side of which flocking is applied, said pad being bonded to said ring so that said flocking contacts said annular film having a magnetic recording surface.

References Cited in the file of this patent

UNITED STATES PATENTS

| | | |
|---|---|---|
| 1,875,766 | Schubert | Sept. 6, 1932 |
| 1,946,596 | Symonds | Feb. 13, 1934 |
| 2,567,092 | Williams | Sept. 4, 1951 |
| 2,592,602 | Saks | Apr. 15, 1952 |
| 2,819,186 | Franck | Jan. 7, 1958 |

OTHER REFERENCES

IBM Technical Disclosure Bulletin vol. 2, No. 4, December 1959 (1 page).